(12) United States Patent
Adachi et al.

(10) Patent No.: US 6,485,184 B1
(45) Date of Patent: Nov. 26, 2002

(54) ROLLING BEARING

(75) Inventors: Ken Adachi, Kashiba (JP); Hiroshi Komiya, Kashihara (JP)

(73) Assignee: Koyo Seiko Co., Ltd., Osaka (JP)

( * ) Notice: Subject to any disclaimer, the term of this patent is extended or adjusted under 35 U.S.C. 154(b) by 70 days.

(21) Appl. No.: 09/669,876

(22) Filed: Sep. 27, 2000

(30) Foreign Application Priority Data

| Sep. 29, 1999 | (JP) | ............................................ 11-275829 |
| Sep. 29, 1999 | (JP) | ............................................ 11-275830 |
| Sep. 29, 1999 | (JP) | ............................................ 11-275831 |

(51) Int. Cl.$^7$ ............................................ F16C 33/66
(52) U.S. Cl. ...................................... 384/463; 384/907
(58) Field of Search ................................ 384/463, 470, 384/907

(56) References Cited

U.S. PATENT DOCUMENTS

| 3,135,564 A | 6/1964 | Agens ........................ 384/410 |
| 4,223,963 A | 9/1980 | Glodin et al. ............... 384/527 |
| 4,492,415 A | 1/1985 | Baile et al. .................. 384/463 |
| 4,534,871 A | * 8/1985 | Johnson ....................... 384/463 |
| 5,588,751 A | 12/1996 | Nakata et al. .............. 384/463 |
| 5,615,956 A | 4/1997 | Oba et al. ................... 384/470 |
| 5,804,536 A | 9/1998 | Asao et al. ................. 508/100 |
| 6,228,813 B1 | * 5/2001 | Yabe et al. ................. 384/463 |

FOREIGN PATENT DOCUMENTS

| JP | 5-287565 | 11/1993 |
| JP | 9-59664 | 3/1997 |

OTHER PUBLICATIONS

English–language Abstract of Japanese patent publication No. 55109824.
English–language Abstract of Japanese patent publication No. 07127644.
English–language Abstact of Japanese patent publication No. 09014273.

* cited by examiner

*Primary Examiner*—Thomas R. Hannon
(74) *Attorney, Agent, or Firm*—Rabin & Berdo, P.C.

(57) ABSTRACT

A rolling bearing has first and second races that define an annular space therebetween. A plurality of rolling elements roll on the races. The space is filled with a solid lubricant composition containing a resin polymer. The space is preferably sealed with a pair of sealing members which are interposed between the races and a region between the lubricant composition and the corresponding sealing member in the space is filled with grease.

20 Claims, 2 Drawing Sheets

ROLLING BEARING

CROSS REFERENCE TO RELATED APPLICATION

This application claims priority benefits based under 35 USC §119 of Japanese Patent Application Serial No. 11-275829, Japanese Patent Application Serial No. 11-275830 and Japanese Patent Application Serial No. 11-275831, the disclosure of which is incorporated by reference.

BACKGROUND OF THE INVENTION

1. Field of the Invention

The present invention relates to a rolling bearing filled with a polymer containing a lubricant.

2. Description of Related Arts

In a paper making machine, for example, a paper web is pulled with a pair of ropes attached to either corner of the leading edge thereof, thereby to pass through paper making processes sequentially. The paper passes through rollers while the ropes are wound successively around a number of carrier wheels. The carrier wheels are supported freely rotatably by rolling bearings.

The rolling bearings for the carrier wheels are subjected to a severe operating environment particularly in a dryer section where the paper is dried. In the dryer section, temperature and humidity may be as high as 100 to 120° C. and 100%, respectively, while the rolling bearings may be directly exposed to water splash.

Although the rolling bearings described above are provided with ordinary sealing members, rolling bearings are intrinsically difficult to seal completely even with the sealing member, due to the construction thereof. Thus water may enter the rolling bearing thereby causing rust therein.

To counter the problem described above, the inside of the rolling bearing may be filled with grease. This will have a rust prevention effect since the grease that fills the inside prevents moisture from entering the inside of the bearing. But the grease increases the torque required to rotate the bearing. Also because it is difficult to completely seal the bearing as described above, part of the filling grease may leak to the outside due to thermal expansion or other cause.

Meanwhile, there are rolling bearings of such a type as where a resin is impregnated with a lubricating oil so that the bearing is lubricated by the lubricating oil that oozes out of the resin. However, when the rolling bearings of this type are used for the application described above, moisture that enters the bearing leads to rusting and causes the service life to be even shorter than that of the grease-filled rolling bearing.

Similar problems are encountered in the cases of bearings used in a conveyor of a continuous car washing machine that carries vehicles on the conveyor and washes the vehicles continuously, bearings for the rolls of the pickling line of a steel mill, wheel supporting bearings of an agricultural vehicle and wheel supporting bearings of an unmanned vehicle automatically operated in and outside of a factory.

SUMMARY OF THE INVENTION

An object of the present invention is to provide a rolling bearing which is not likely to rust even in a severe environment or allow lubricant to leak, and rotates with a low torque.

In order to achieve the object described above, a preferable aspect of the present invention is directed to a rolling bearing comprising: first and second races that define an annular space (7) formed therebetween; a plurality of rolling elements arranged in the space and rolling on each of the races; and rust-preventive means that prevent rust from being generated in the space; the rust-preventive means containing a solid lubricant composition, with which the space is filled; the lubricant composition containing a resin polymer.

In this case, since the bearing is lubricated by a lubricating agent that oozes out of the lubricant composition, greasing is made unnecessary while achieving a low torque. At the same time, the lubricating agent prevents the rolling elements and the races from rusting.

The space at least in a region of which that encloses the rolling elements is preferably filled with the lubricant composition, while the rust-preventive means further includes a pair of sealing members which are arranged between corresponding end portions of the pair of races and seal the space, and grease with which a region between the lubricant composition and the corresponding sealing members in the space is filled.

In this case, since the lubricant composition that covers the rolling elements is further covered by the grease, moisture can be prevented from entering the space and, as a result, it is made possible to prevent rust from being generated and elongate the service life of the bearing. Also, because the amount of the grease filling the region not occupied by the lubricant composition in the space is small, there is no possibility of the lubricating oil leaking to the outside as in the bearing filled with grease throughout the space.

Also, a vapor phase rust-preventive agent is preferably added to the lubricant composition. This makes it possible to prevent rusting by the action of the vapor phase rust-preventive agent even when moisture enters the space, thereby elongating the service life of the bearing. The vapor phase rust-preventive agent exerts a rust preventive effect continuously in a large region in the space that includes the vapor phase rust-preventive agent and has particularly great effect of preventing rust from being generated.

Also a first additive containing a metal sulfonate and a second additive containing sorbitan are preferably added to the lubricant composition. In this case, even when moisture enters the space, rusting can be prevented from occurring by the action of both additives thereby elongating the service life of the bearing. Combined use of the first additive containing a metal sulfonate and the second additive containing sorbitan achieves particularly great rust prevention effects.

DETAILED DESCRIPTION OF THE PREFERRED EMBODIMENT

Preferred embodiments of the present invention will be described below with reference to the accompanying drawings.

Figure 1:
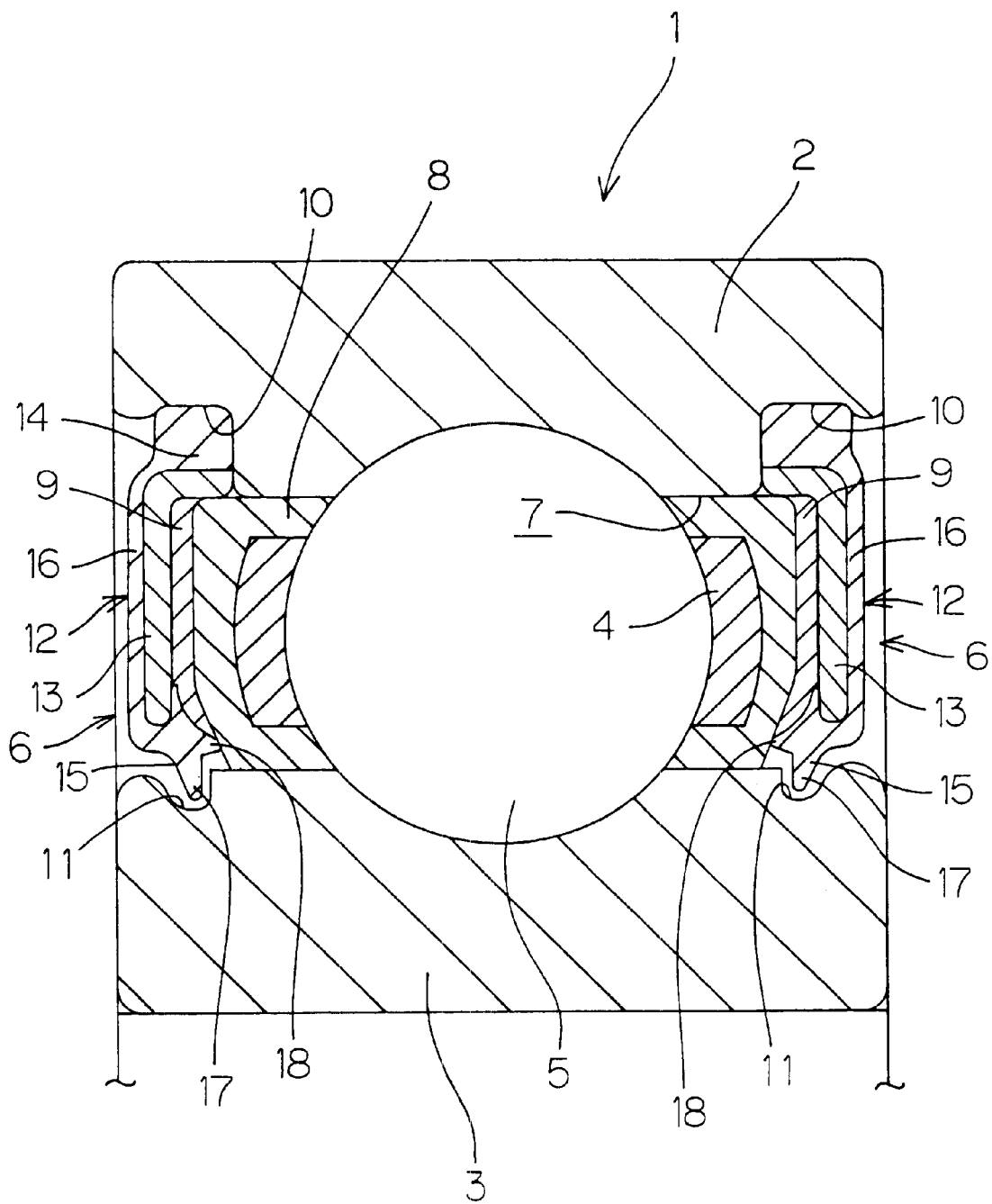
FIG. 1 is a sectional view of a rolling bearing according to one embodiment of the present invention.

FIG. 1 is a sectional view of a rolling bearing according to one embodiment of the present invention. In FIG. 1, the rolling bearing 1 is composed of, for example, a ball bearing with rolling elements 5 consisting of, for example, a plurality of balls which are interposed between an outer ring 2 and an inner ring 3 and are held by a cage 4.

A space between corresponding end portions of the outer ring 2 and the inner ring 3 is sealed with a sealing member 6, with the space 7 formed inside being filled with an annular lubricant composition 8 and grease 9.

The lubricant composition 8 is formed in such a size that occupies a region that just covers the rolling elements 5 and the cage 4, while all the remaining region is filled with the grease 9. Portion of the space 7 occupied by the lubricant composition 8 is set within a range from 60 to 80% by volume. The grease 9 fills the region between each of the sealing members 6 and the end face of the lubricant composition 8 that opposes the sealing members 6, with 20 to 40% by volume of the space 7 being occupied by the grease 9.

The outer ring 2 has annular recess 10 formed on both ends of the inner surface thereof, and annular groove 11 formed on both ends of the outer surface of the inner ring 3. Each of the sealing members 6 comprises a body 12 formed in a ring shape and made from rubber and a reinforcement plate 13 formed in a ring shape that reinforces the body.

The body 12 has an outer seal portion 14 formed in a ring shape, an inner seal portion 15 and a main body 16. The outer seal portion 14 is housed in the annular recess 10 of the outer ring 2 and is held therein. The inner seal portion 15 has a first portion 17 that enters the annular groove 11 of the inner ring 3 and forms a labyrinth structure, and a second portion which is a lip 18 that elastically presses the surface of the lubricant composition 8. The main portion 16 connects the outer seal portion 14 and the inner seal portion 15 continuously. The reinforcement plate 13 is a metal plate having a ring shape with L-shaped cross section, which reinforces the sealing member 6 along the main body 16 and the outer seal portion 14.

There can be preferably used the lubricant composition 8 comprising:

(a) a polymer comprising an ultra-high-molecular-weight polyethylene resin, a thermoplastic resin such as polypropylene and polymethylpentene, or a thermosetting resin such as polyether polyurethane resin;

(b) grease selected from metal soap type grease and non-metal soap type organic grease, or lubricating oil such as poly-α-olefin; and (c) a rust-preventive additive.

In particular, as the polymer (a), there can be preferably used a polyurethane resin which is obtained by using a urethane prepolymer having an isocyanate group content of 6 to 10% by weight and a molecular weight of about 400 to 10,000 with an amine curing agent. With regard to the hardness of the lubricant composition 8 after curing, one having an international rubber hardness unit (IRHD, determined by the measuring method described in JIS K 6253) within a range from 60 to 85 is preferably used.

In case of the lubricant composition obtained by using a polymer having an isocyanate group content of less than 6% by weight as the urethane prepolymer, the hardness after curing does not reach 60 IRHD. Therefore, filling of the bearing with the lubricant composition is liable to cause an increase in torque during the running and the lubricant composition is deteriorated, thereby making it impossible to elongate the service life of the bearing. On the other hand, when the content of the isocyanate group exceeds 10% by weight, the amount of oil to be supplied from the lubricant composition decreases, thereby shortening the service life. Therefore, the lubricant composition is not suited for use as a bearing lubricant.

The urethane polymer includes, for example, commercial products such as Hyprene HL-951, Hyprene HL-6502, Hyprene L-315, Hyprene AX-596C, and Hyprene P-760 (all of them are manufactured by Mitsui Chemicals, Inc.).

An ultra-high-molecular-weight polyethylene having an average molecular weight within a range from about 1,000,000 to 6,000,000, particularly 2,000,000 and higher, and a melting point within a range from about 100 to 140° C. is preferably used.

Examples of the grease as the component (b) of the lubricant composition include grease containing an alkali metal salt, an alkali earth metal salt or an aluminum salt of an aliphatic monocarboxylic acid in having 12 to 24 carbon atoms as a thickening agent; grease containing an alkali metal salt or an alkali earth metal salt of an aliphatic monocarboxylic acid having 12 to 24 carbon atoms, which has at least one hydroxyl group, as a thickening agent; calcium complex soap grease containing a calcium salt of at least one of an aliphatic monocarboxylic acid having 12 to 24 carbon atoms, which has at least one hydroxyl group, an aliphatic monocarboxylic acid having 2 to 11 carbon atoms, and an aliphatic monocarboxylic acid having 2 to 11 carbon atoms as a thickening agent; aluminum complex soap grease containing an aluminum salt of an aliphatic monocarboxylic acid having 12 to 24 carbon atoms and a aromatic monocarboxlic acid having 7 to 24 carbon atoms as a thickening agent; lithium complex soap grease containing a lithium salt of at least one of an aliphatic monocarboxylic acid having 12 to 24 carbon atoms and an aliphatic monocarboxylic acid having at least one hydroxyl group having 12 to 24 carbon atoms and at least one of an aliphatic dicarboxylic acid or dicarboxylate having 2 to 12 carbon atoms, or an aromatic monocarboxylic acid or monocarboxylate or phosphates or borates having 7 to 24 carbon atoms as a thickening agent; and grease containing a diurea compound (represented by $R^1NHCONHR^2NHCONHR^1$, wherein $R^1$ represents a straight-chain or branched saturated or unsaturated alkyl group having 6 to 24 carbon atoms, and $R^2$ represents a divalent aromatic hydrocarbon group having 6 to 15 carbon atoms).

A base oil in the grease is used in a conventional lubricating grease and a synthetic hydrocarbon oil (e.g., poly-α-olefin oil) having a kinematic viscosity at 40° C. within a range from 50 to 460 mm$^2$/s is preferably used.

Examples of the lubricating oil include mineral oil, diester oil, polyol ester oil, alkyldiphenylether oil, silicon oil, paraffin oil, and fluorine oil, including poly-α-olefin oil.

The amine curing agent whose amino group content is from 1 to 10% by weight is preferred. Examples of the amine curing agent include aromatic polyamine curing agents such as MC-506, MC-591 and MDA-220 (any of them are manufactured by Mitsui Chemicals, Inc.), Adecahardner CA125 (manufactured by Asahi Denka Kogyo) and Ethacure 100 (manufactured by Arbemare Asano); alicyclic amine curing agents such as Wandamine HM (4,4-diaminodicyclohexylmethane (manufactured by Shin Nippon Rika) and 1,2-dimainocyclohexane (manufactured by Du Pont); aliphatic amine curing agents such as hexamethylenediamine (manufactured by Du Pont), ethylenediamine (manufactured by Kanto Denka Kogyo), Trilon BS (ethylenediaminetetraacetic acid) (BASF), Jefarmine D-2000 (polyoxyalkylenesimine) (manufactured by Mistui Texacochemical).

Usually, the lubricant composition of the present invention is prepared so that it contains 18.3 to 79.6% by weight of the urethane prepolymer as the component (a), 20 to 80% by weight of the grease as the component (b), and 0.1 to 6.7% by weight of the amine curing agent.

Examples of the rust-preventive additive as the component (c) include metal sulfonates such as sodium sufonate, potassium sulfonate, calcium. sulfonate, and barium sulfonate; synthetic sulfonates such as dinonylnaphthalene sulfonate and octadecylbenzene sulfonate; and polyhydric alcohol fatty esters such as sorbitan monooleate.

In particular, those comprising the first additive containing a metal sulfonate and the second additive containing sorbitan are preferred. The first additive may contain the synthetic sulfonate. In addition, it is preferred that the first additive and the second additive are incorporated in almost the same amounts to increase the rust prevention effect.

The amount of the rust-preventive additive is preferably within a range from 2 to 6% by weight based on the total amount of the lubricant composition 8. The reason is as follows. That is, when the amount of the rust-preventive additive is less than 2% by weight, sufficient rust prevention effect can not be obtained. On the other hand, when the amount of the rust-preventive additive exceeds 6% by weight, there is a disadvantage that the service life of the lubricant is lowered.

If necessary, additives such as antioxidants and extreme-pressure additives for the improvement of the wear resistance may be added to the lubricant composition 8, in addition to the rust-preventive additive.

Examples of the antioxidant include phenolic antioxidants. Examples of the extreme-pressure additive include compounds such as chlorinated paraffin, tricresyl phosphate, and zinc dialkyldithiophosphate.

The grease 9 is not specifically limited, but is preferably the same or same type of grease as that of the component (b) in view of the compatibility with the lubricant composition.

In the lubricant composition 8 containing the above components (a), (b) and (c), the total amount of the components (a) and (c) is preferably within a range from 20 to 80% by weight, and more preferably from 40 to 60% by weight, based on the total amount of the composition. When the total amount is less than 20% by weight, the lubricant composition is too soft to provide a solid lubricant. On the other hand, when the total amount exceeds 80% by weight, the lubricant composition is too hard and is almost like resin, thereby to cause less oozing out of the lubricant and is liable to cause poor lubrication.

The weight ratio of the urethane prepolymer to the amine curing agent is preferably within a range from 200:1 to 11:1, and more preferably 50:1 to 20:1. When the ratio is less than 200:1, it is not suited for practical use because of small curing rate (time required to the completion of solidification). On the other hand, when the ratio exceeds 11:1, it is uneconomical.

The lubricant composition 8 is obtained by mixing the above components in the ratio described above, followed by curing. These processes are preferably carried out by mixing the urethane prepolymer and amine curing agent contained in the grease using a static mixer or a reaction injection molder while filling the rolling bearing with grease so that the urethane prepolymer is cured after filling the bearing with it. On filling using a static mixer, the amine curing agent is preferably incorporated into the grease (b) and the lubricant composition is preferably incorporated so that the lubricant composition is in the mixed state at a predetermined ratio in the bearing. Other additives may be incorporated into the components (a) and/or (b) in a predetermined amount.

The lubricant composition, with which the rolling bearing is filled, is then cured by allowing to stand for about several minutes to 24 hours at a temperature ranging from room temperature to 170° C.

According to this embodiment, since the bearing is lubricated by a lubricating agent that oozes out of the lubricant composition 8 that surrounds the rolling elements 5, greasing is made unnecessary thus making the bearing free of maintenance while achieving a low torque.

Also, because the lubricant composition 8 that covers the rolling elements 5 is further covered by the grease 9 on the outside thereof, moisture can be prevented from entering the space 7 that is sealed by the sealing member 6. As a result, it is made possible to prevent rust from being generated and elongate the service life of the bearing.

Moreover, since the grease 9 that fills the space 7 occupies a small portion of the space 7, for example 20 to 40% by volume, and there is no possibility of the lubricating oil leaking to the outside due to thermal expansion or other cause as in the case of the bearing of which inner space is entirely filled with grease. Particularly as the sealing member 6 is provided with the lip 18 for the lubricant composition 8, a high sealing effect for the grease 9 is obtained.

In the above embodiments, a high-molecular weight-polyethylene may be used as a polymer of the component (a) and a poly-α-olefin may be used as lubricating oil of the component (b). In this case, the high-molecular weight-polyethylene is appropriately incorporated so that its amount is within a range from 10 to 50% by weight based on the total amount. The poly-α-olefin is incorporated so that its amount is within a range from 44 to 88% by weight based on the total amount. The amount of the rust-preventive additive as the component (c) is similarly selected within a range from 2 to 6% by weight. If necessary, the above antioxidant and extreme-pressure additives for the improvement of the wear resistance may be added to the lubricant composition, in addition to the rust-preventive additive.

A vapor phase rust-preventive agent can be used in place of or in combination with the rust-preventive agent described as the component (c). Examples of the vapor phase rust-preventive agent include dicyclohexylammonium nitrate (DICHAN), cyclohexylamine carbamate (CHC), diisopropylammonium nitrate (DIPAN), nitonaphthalene-ammonium nitrate (NITAN), MBT, benzotriazole, methylbenzotriazole, dicyclohexylammonium caprylate, and cyclohexylammonium laurate. The amount of the vapor phase rust-preventive agent is preferably within a range from 2 to 10% by weight based on the lubricant composition 8.

Figure 2:
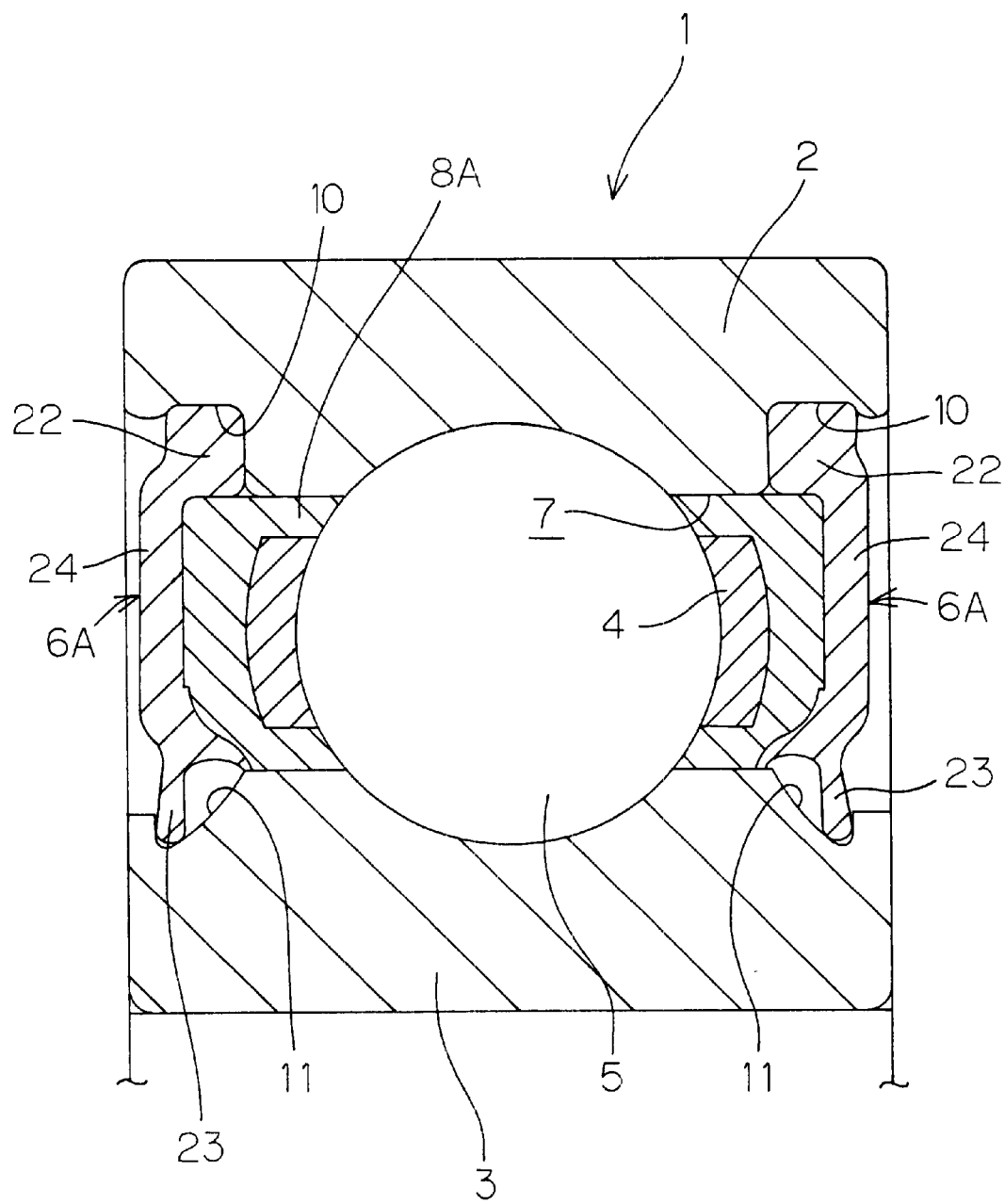
FIG. 2 is a sectional view of a rolling bearing according to another embodiment of the present invention.

FIG. 2 is a sectional view of a rolling bearing according to another embodiment of the present invention. 5 As shown in FIG. 2, in a rolling bearing 1A of this embodiment, a sealing member 6A made of rubber seals between the corresponding end portions of the outer ring 2 and the inner ring 3, while the space 7 formed inside is filled with a solid lubricant composition 8A having 10 a ring shape. The lubricant composition 8A is formed to such a size that covers the rolling elements 5 and the cage 4 and occupies substantially the whole of the space 7.

Each of the sealing members 6A has an outer seal portion 22 formed in a ring shape, an inner seal portion 23 and a main portion 24. The outer seal portion 22 is housed in the annular recess 10 of the outer ring 2 and is held therein. The inner seal portion 23 has double-lip structure that makes sliding contact with the inner surface and the edge of the annular groove 11 of the inner ring 3. The main portion 24 connects the outer seal portion 22 and the inner seal portion 23 continuously.

There can be preferably used a lubricant composition 8A comprising:
(a) a polymer comprising an ultra-high-molecular-weight polyethylene resin, a thermoplastic resin such as polypropylene and polymethylpentene, or a thermosetting resin such as polyether polyurethane resin;
(b) grease selected from metal soap type grease and non-metal soap type organic grease, or lubricating oil such as poly-α-olefin; and
(c) a rust-preventive additive.

The components (a) and (b) of the lubricant composition 8A are the same as the components (a) and (b) of the lubricant composition 8 of the embodiment in FIG. 1 so that description thereof will be omitted.

As the rust-preventive additives as the component (c), a vapor phase rust-preventive agent is used. Examples of the vapor phase rust-preventive agent include dicyclohexylammonium nitrate (DICHAN), cyclohexylamine carbamate (CHC), diisopropylammonium nitrate (DIPAN), nitonaphthaleneammonium nitrate (NITAN), MBT, benzotriazole, methylbenzotriazole, dicyclohexylammonium caprylate, and cyclohexylammonium laurate.

In addition to the vapor phase rust-preventive agent, rust-preventive additives such as rust-preventive agent containing a metal sulfonate, rust-preventive agent containing a synthetic sulfonate and rust-preventive agent containing a sorbitan may be added. In this case, the rust prevention effect can be further improved.

As the metal sulfonate, for example, sodium sulfonate, potassium sulfonate, calcium sulfonate, and barium sulfonate can be preferably used. As the synthetic sulfonate, for example, dinonylnaphthalene sulfonate and octadecylbenzene sulfonate can be preferably used. The rust-preventive agent containing sorbitan includes, for example, polyhydric alcohol fatty esters such as sorbitan monooleate.

The amount of the vapor phase rust-preventive agent is preferably within a range from 2 to 10% by weight based on the total amount of the lubricant composition 8A. When the amount of the vapor phase rust-preventive agent added is less than 2% by weight, sufficient rust prevention effect cannot be achieved and, when the amount is higher than 10% by weight, the amount of the lubricant and/or the grease becomes insufficient thus resulting in a lower effect of lubrication. If necessary, additives such as antioxidants and extreme-pressure additive for the improvement of the wear resistance-may be added to the lubricant composition 8A.

The amounts of the components (a) and (c) are the same as that in case of the lubricant composition 8 of the embodiment shown in FIG. 1, and are preferably within a range from 20 to 80% by weight, and more preferably from 40 to 60% by weight based on the total amount of the lubricant composition 8A. The method of fabricating the lubricant composition 8A is also the same as the method of fabricating the lubricant composition 8.

In this embodiment, since the bearing is lubricated by the lubricating agent that oozes out of the lubricant composition 8A that covers the rolling elements 5, greasing is made unnecessary thus making the bearing free of maintenance while achieving a low torque. Also there is no possibility of the lubricant leaking to the outside due to thermal expansion or other cause as in the case of a bearing of which inner space is entirely filled with grease.

It is also made possible to prevent rusting by the action of the vapor phase rust-preventive agent even when moisture enters the space 7, thereby elongating the service life of the bearing. The vapor phase rust-preventive agent also exerts a rust preventive effect continuously in a large region in the space 7 filled with the vapor phase rust-preventive agent and has a particularly great effect of preventing rust.

Particularly, the sealing member 6A of contact type prevents moisture from entering the space 7 and the vapor phase rust-preventive agent from leaking to the outside of the space 7, thereby reliably preventing rust from being generated.

In this embodiments, the high-molecular weight-polyethylene may be used as a polymer of the component (a) and the poly-α-olefin may be used as a lubricating oil of the component (b). In this case, the high-molecular weight-polyethylene is preferably incorporated so that its amount is within a range from 10 to 50% by weight based on the total amount. The poly-α-olefin is incorporated so that its amount is within a range from 40 to 88% by weight based on the total amount. The amount the vapor phase rust-preventive additive as the component (c) is similarly selected within a range from 2 to 10% by weight based on the total amount. If necessary, the above antioxidants and extreme-pressure additives for the improvement of the wear resistance may be added to the lubricant composition, in addition to the rust-preventive additive.

Next, another embodiment of the present invention will be described below. This embodiment and the embodiment in FIG. 2 are different in that the rust-preventive additive as the component (c) in the lubricant composition 8A comprising the first additive containing a metal sulfonate and the second additive containing a sorbitan is used in this embodiment.

As the metal sulfonate contained in the first 5 additive of the rust-preventive agent as the component (c), for example, sodiumsulfonate, potassiumsulfonate, calcium sulfonate, and barium sulfonate are preferably used. The first additive may contain synthetic sulfonates such as dinonylnaphthalene sulfonate and octadecylbenzene sulfonate. The second additive containing sorbitan includes, for example, polyhydric alcohol fatty esters such as sorbitan monooleate.

The amount of the additive is preferably within a range from 2 to 6% by weight based on the total amount of the lubricant composition 8A. The reason is as follows. That is, when the amount of the rust-preventive additive is less than 2% by weight, sufficient rust prevention effect can not be obtained. On the other hand, when the amount of the rust-preventive additive exceeds 6% by weight, there is a disadvantage that the service life of the lubricant is lowered. The first additive and second additive are preferably added in almost the same amount to enhance the rust prevention effect.

Since the rest of this embodiment is the same as the embodiment shown in FIG. 2, description thereof will be omitted.

In this embodiment, since the bearing is lubricated by the lubricating agent that oozes out of the lubricant 5 composition 8A that covers the rolling elements 5, greasing is made unnecessary thus making the bearing free of maintenance while achieving a low torque. Also, there is no possibility of the lubricant leaking to the outside due to thermal expansion or other cause as in the case of a bearing of which inner space is entirely filled with grease.

Moreover, since the lubricant composition 8A that covers the rolling elements 5 includes an rust-preventive additive containing a metal sulfonate additive and a sorbitan additive, even when moisture enters the space (7), rusting can be prevented from occurring, thereby elongating the service life of the bearing.

Particularly since the sealing performance is improved by means of the sealing member 6A of contact type that makes contact with the inner ring 3 which is a rotating ring, moisture can be reliably prevented from entering the space 7 and, as a result, it is made possible to reliably prevent rust from being generated and elongate the service life of the bearing.

In this embodiment, the ultra-high-molecular-weight polyethylene may be used as the polymer of the component (a) and the poly-α-olefin may be used as a lubricating oil of the component (b). The ultra-high-molecular-weight polyethylene is incorporated in an amount within a range from 10 to 50% by weight based on the total amount, and the poly-α-olefin is incorporated in an amount within a range from 44 to 88% by weight based on the total amount. The amount of the rust-preventive additive of the component (c) is selected within a range from 2 to 6% by weight based on the total amount. If necessary, additives such as antioxidants and extreme-pressure additives for the improvement of the wear resistance may be added to the lubricant composition, in addition to the rust-preventive additive.

What is claimed is:

1. A rolling bearing, comprising
   first and second races that define an annular space formed therebetween;
   a plurality of rolling elements arranged in the space and rolling on each of the races; and
   rust-preventive means that prevents rust from being generated in the space, wherein
      the rust-preventive means contains a solid lubricant composition, with which the space is filled,
      the lubricant composition contains a resin polymer, and
      a vapor phase rust-preventive agent is added to the lubricant composition.

2. A rolling bearing, comprising:
   first and second races that define an annular space formed therebetween;
   a plurality of rolling elements arranged in the space and rolling on each of the races; and
   rust-preventive means that prevents rust from being generated in the space, including
      a pair of sealing members interposed between corresponding ends of the pair of races for sealing the space, and
      grease with which a region between the lubricant composition and the corresponding sealing member in the space is filled, wherein
         the rust-preventive means contains a solid lubricant composition, with which the space is filled,
         the lubricant composition contains a resin polymer, and
         the region that covers at least the rolling elements in the space is filled with the lubricant composition.

3. The rolling bearing according to claim 2, wherein the proportion of volume occupied by the lubricant composition in the space is within a range from 60 to 80% by volume.

4. The rolling bearing according to claim 2, wherein the lubricant composition contains the same grease as the grease.

5. The rolling bearing according to claim 2, wherein each of the sealing members has a lip that makes elastic contact with the surface of the lubricant composition.

6. The rolling bearing according to claim 2, wherein a vapor phase rust-preventive agent is added to the lubricant composition.

7. The rolling bearing according to claim 6, wherein the amount of the vapor phase rust-preventive agent is within a range from 2 to 10% by weight based on the total weight of the lubricant composition.

8. The rolling bearing according to claim 6, wherein the vapor phase rust-preventive agent contains at least one selected from the group consisting of dicyclohexylammonium nitrate, cyclohexylamine carbamate, diisopropylammonium nitrate, nitonaphthaleneammonium nitrate, benzotriazole, methylbenzotriazole, dicyclohexylammonium caprylate, and cyclohexylammonium laurate.

9. The rolling bearing according to claim 6, wherein the rust-preventive means further include a pair of sealing members which are interposed between corresponding end portions of the first and second races while hermetically sealing the space.

10. The rolling bearing according to claim 9, wherein each of the sealing members has a portion held by the first race and a portion that makes sliding contact with the second race.

11. The rolling bearing according to claim 10, wherein the portion that makes sliding contact with the second race has double-lip construction.

12. The rolling bearing according to claim 2, wherein a first additive containing a metal sulfonate and a second additive containing sorbitan are added to the lubricant composition.

13. The rolling bearing according to claim 12, wherein the metal sulfonate contained in the first additive is at least one selected from the group consisting of sodium sulfonate, potassium sulfonate, calcium sulfonate, and barium sulfonate.

14. The rolling bearing according to claim 12, wherein the first additive contains at least one synthetic sulfonate selected from the group consisting of dinonylnaphthalene sulfonate and octadecylbenzene sulfonate.

15. The rolling bearing according to claim 12, wherein the second additive contains a polyhydric alcohol fatty ester.

16. The rolling bearing according to claim 15, wherein the polyhydric alcohol fatty ester contains sorbitan monooleate.

17. The rolling bearing according to claim 12, wherein the rust-preventive means further include a pair of sealing members which are interposed between corresponding end portions of the pair of races while hermetically sealing the space.

18. The rolling bearing according to claim 2, wherein the resin of the resin polymer is selected from the group consisting of polyethylene, polypropylene, polymethylpentene, and polyurethane.

19. The rolling bearing according to claim 2, wherein the lubricant composition contains a lubricating component selected from grease and lubricating oil and the grease is selected from metal soap type grease and non-metal soap type grease.

20. The rolling bearing according to claim 19, wherein the lubricating oil is at least one selected from the group consisting of poly-α-olefin oil, mineral oil, diester oil, polyol ester oil, alkyl diphenyl ether oil, silicon oil, paraffin oil, and fluorine oil.

* * * * *